US012755546B2

(12) United States Patent
Watanabe et al.

(10) Patent No.: US 12,755,546 B2
(45) Date of Patent: Oct. 6, 2026

(54) INFORMATION PROCESSING APPARATUS, INFORMATION PROCESSING METHOD, AND STORAGE MEDIUM

(71) Applicant: TOYOTA JIDOSHA KABUSHIKI KAISHA, Aichi-ken (JP)

(72) Inventors: Kei Watanabe, Tokyo (JP); Daisuke Akihisa, Tokyo (JP); Hiroshi Oda, Tokyo (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 46 days.

(21) Appl. No.: 18/731,355

(22) Filed: Jun. 3, 2024

(65) Prior Publication Data

US 2024/0412518 A1 Dec. 12, 2024

(30) Foreign Application Priority Data

Jun. 7, 2023 (JP) ................................ 2023-094145

(51) Int. Cl.
*G06V 20/52* (2022.01)
*G06V 10/26* (2022.01)

(52) U.S. Cl.
CPC .............. *G06V 20/52* (2022.01); *G06V 10/26* (2022.01)

(58) Field of Classification Search
CPC ............................... G06V 10/26; G06V 20/52
USPC .......................................................... 348/143
See application file for complete search history.

(56) References Cited

U.S. PATENT DOCUMENTS 9,253,375 B2 * 2/2016 Milanfar .............. H04N 23/811
9,641,763 B2 * 5/2017 Bernal ............. G08B 13/19645
11,756,339 B2 * 9/2023 Rao ...................... G06N 3/0464
2006/0067456 A1 * 3/2006 Ku ........................... G07C 9/00 377/6
2008/0007720 A1 * 1/2008 Mittal .................... H04N 23/90 348/E7.086
2008/0055412 A1 3/2008 Tanaka
2010/0013917 A1 * 1/2010 Hanna .............. G08B 13/19689 348/E13.001
2016/0142679 A1 * 5/2016 Miyoshi ................. G06V 20/53 348/159
2018/0197039 A1 * 7/2018 Guerreiro .............. B60K 35/28
2019/0180597 A1 * 6/2019 Wang ..................... G06V 40/23
2022/0036051 A1 * 2/2022 Minoura .................. H04N 7/18
2024/0276106 A1 * 8/2024 Yu ........................ H04N 23/661

FOREIGN PATENT DOCUMENTS

JP 2000-333156 A 11/2000
JP 2008-060947 A 3/2008
JP 2017-225108 A 12/2017
JP 2021-010069 A 1/2021
JP 2021164080 A 10/2021

* cited by examiner

*Primary Examiner* — William C Vaughn, Jr.
*Assistant Examiner* — Astewaye Gettu Zewede
(74) *Attorney, Agent, or Firm* — HAUPTMAN HAM, LLP

(57) ABSTRACT

An information processing apparatus comprises a controller configured to generate an evaluation result obtained by evaluating a degree of a field of view of a security camera disposed in a predetermined space being shielded due to an object, on a basis of: structure data regarding a structure existing in the predetermined space; and object data regarding the object that moves within the predetermined space.

17 Claims, 11 Drawing Sheets

FIG. 3A

| STRUCTURE ID | TYPE | POSITION INFORMATION |
|---|---|---|
| S001 | WALL | ... |
| S011 | COLUMN | ... |
| S021 | WINDOW | ... |
| ... | ... | ... |

FIG. 3B

| OBJECT ID | TYPE | SHAPE INFORMATION | TIME POINT INFORMATION | MOVEMENT INFORMATION |
|---|---|---|---|---|
| 101 | PERSON | ... | | |
| 102 | PERSON | ... | | |
| 103 | PERSON | ... | | |
| ... | ... | ... | | |

| STRUCTURE ID | MATERIAL ID | CHARACTERISTIC INFORMATION |
|---|---|---|
| S001 | M001 | … |
| S011 | M002 | … |
| S021 | M003 | … |
| … | … | … |

FIG. 8

| TYPE | ILLUMINATION CONDITION | AZIMUTH ANGLE | ANGLE |
|---|---|---|---|
| SUNLIGHT | ... | ... | ... |
| ... | ... | ... | ... |

FIG. 9

INFORMATION PROCESSING APPARATUS, INFORMATION PROCESSING METHOD, AND STORAGE MEDIUM

CROSS REFERENCE TO THE RELATED APPLICATION

This application claims the benefit of Japanese Patent Application No. 2023-094145, filed on Jun. 7, 2023, which is hereby incorporated by reference herein in its entirety.

BACKGROUND

Technical Field

The present disclosure relates to a security camera.

Description of the Related Art

A system for optimizing monitoring by a security camera is known.

For example, Japanese Patent Laid-Open No. 2017-225108 discloses an invention related to a system that changes or corrects a monitoring region of a security camera on the basis of structure information.

SUMMARY

The present disclosure is directed to evaluating a region that can be monitored by a security camera.

The present disclosure in its one aspect provides an information processing apparatus comprises a controller configured to generate an evaluation result obtained by evaluating a degree of a field of view of a security camera disposed in a predetermined space being shielded due to an object, on a basis of: structure data regarding a structure existing in the predetermined space; and object data regarding the object that moves within the predetermined space.

The present disclosure in its another aspect provides an information processing method to be executed by an information processing apparatus, the information processing method comprising: a step of acquiring structure data regarding a structure existing in a predetermined space; a step of acquiring object data regarding an object that moves within the predetermined space; and a step of generating an evaluation result by evaluating a degree of a field of view of a security camera disposed in the predetermined space being shielded due to the object on a basis of the structure data and the object data.

Further, the other aspects include a program for causing a computer to execute the above-described method or a computer-readable storage medium in which the program is non-temporarily stored.

According to the present disclosure, it is possible to evaluate a region that can be monitored by a security camera.

BRIEF DESCRIPTION OF THE DRAWINGS

FIGS. 3A and 3B are views for explaining data stored in a storage 12;

FIG. 8 is an example of material data to be utilized in a second embodiment;

FIG. 9 is an example of ambient light data to be utilized in the second embodiment;

DESCRIPTION OF THE EMBODIMENTS

Figure 1:
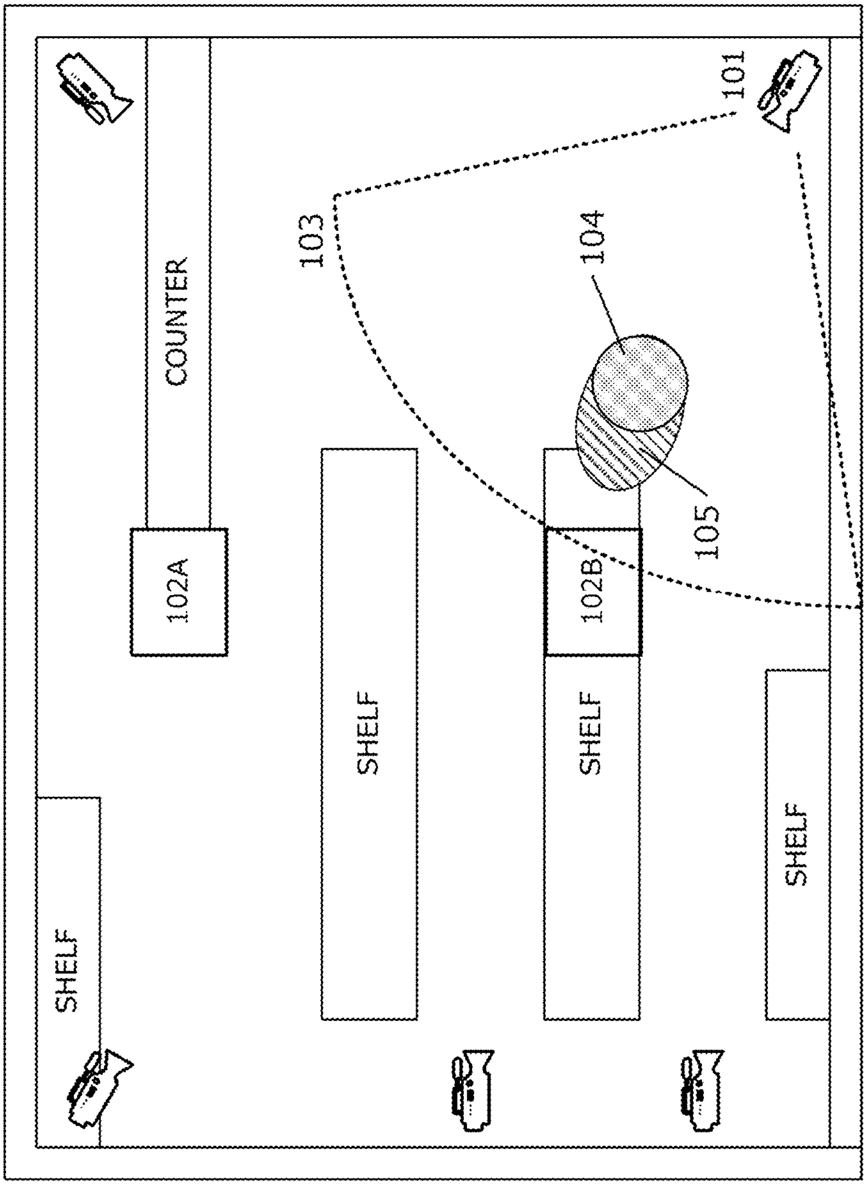
FIG. 1 is a schematic view for explaining a space to be monitored.

A plurality of security cameras are typically utilized to monitor an inside of a predetermined space such as an inside of a store of a commercial facility. In a case where an inside of a facility is monitored by a plurality of security cameras, it is preferable to determine arrangement positions of the security cameras so as to minimize a range that becomes a blind area.

As a technique concerning this, for example, there is a system that calculates regions that can be respectively captured by a plurality of security cameras by utilizing information regarding positions of structures disposed within a space and determines arrangement positions of the security cameras so as to reduce blind areas. This can minimize occurrence of a region that cannot be monitored such as, for example, a region behind a column.

However, in such a system, information other than the information on the structures is not utilized, and thus, there can be a case where a range that can be monitored cannot be appropriately estimated.

For example, a case will be considered where a dynamic object such as a person and an automobile exists within a space to be monitored. Here, if the dynamic object comes in front of the security camera, a field of view of the security camera is shielded, and there is a case where a region that cannot be sufficiently monitored may occur.

For example, a case will be considered where a plurality of security cameras are disposed inside a store for the purpose of automatically making payment of goods. While it is necessary to capture an image of the hand of a user of the store to determine that the user of the store takes the goods from the shelf, if the number of users increases, there is a case where the hand of the target user cannot be viewed by being hidden behind the people.

To solve this problem, it is preferable to evaluate a field of view of the security camera while taking into account existence of a moving object.

The information processing apparatus according to the present disclosure solves such a problem.

An information processing apparatus according to one embodiment includes a controller configured to generate an evaluation result obtained by evaluating a degree of a field of view of a security camera disposed in a predetermined space being shielded due to an object on the basis of structure data regarding a structure existing in the predetermined space and object data regarding the object that moves within the predetermined space.

The predetermined space is a space to be monitored and typically an interior space.

The structure data is data regarding a stationary structure that is located within the space. The structure data may be, for example, data regarding a shape, a size, an arrangement position, and the like, of one or more structures. Further, the structure data may include information regarding an opening (such as, for example, a window) provided in the structure. The structure data may be data representing arrangement of a plurality of structures within a three-dimensional space.

The object data is data regarding an object that moves within the predetermined space. The object data may include, for example, data regarding a type, a size, hours during which the object appears within the predetermined space, movement within the predetermined space, and the like, of the object.

The controller can determine a physical blind area from a specific position by utilizing the structure data and can specify a field of view from a certain security camera. Further, the controller can, for example, simulate movement of the object such as a person located within the space by utilizing the object data. This makes it possible to determine that part of the field of view of the security camera is shielded (that is, a region that can be monitored becomes narrower than expected) due to the object. Further, it is possible to determine a degree of the field of view of the security camera being shielded due to the object.

Note that the controller may calculate a higher evaluation value as a ratio of the region shielded by the object becomes smaller within the field of view of the security camera. In other words, the controller may generate an evaluation value so as to be greater as the shielded region is smaller and so as to be smaller as the shielded region becomes larger.

Further, the controller may calculate a higher evaluation value as a ratio of a period during which at least part of the field of view of the security camera is shielded by the object is smaller with respect to a predetermined time width. In other words, the controller may generate an evaluation value so as to be greater as a period during which shielding occurs is shorter and so as to be smaller as the period during which shielding occurs becomes longer.

Further, the controller may integrate a plurality of evaluation values respectively corresponding to the plurality of security cameras and evaluate an arrangement pattern of the plurality of security cameras. Further, the controller may determine an arrangement pattern of the plurality of security cameras such that a sum of the plurality of evaluation values exceeds a predetermined value.

Further, the object data may further include data regarding hours during which the dynamic object exists in the predetermined space, and the controller may execute calculation of the evaluation value for each of the hours.

Embodiments of the present disclosure will be described below on the basis of the drawings. Configurations of the following embodiments are examples, and the present disclosure is not limited to the configurations of the embodiments.

First Embodiment

Outline of an evaluation apparatus according to a first embodiment will be described. The evaluation apparatus according to the present embodiment is an apparatus that determines optimal arrangement positions of a plurality of security cameras within a predetermined space.

First, optimal arrangement positions of the security cameras will be described. FIG. 1 is a plan view illustrating a space to be monitored by the plurality of security cameras. For example, an interior of a commercial facility such as a store can be set as the space to be monitored.

In FIG. 1, structures such as a wall and a column that obstruct a field of vision exist within the store. For example, columns indicated by reference numerals 102A and 102B exist within the store. In addition, shelves on which goods are displayed, and a counter for a cash register exist inside the store. The shelves and the counter can be set as part of the structures.

Here, an example will be considered where the interior of such a store is monitored by a plurality of security cameras. A reference numeral 101 is a security camera provided at one corner of the store. The security camera has a predetermined viewing angle. It is assumed here that the security camera 101 can capture an image of a range indicated by a reference numeral 103. Note that in the following description, a three-dimensional region for which an image can be captured by each camera without a physical obstacle will be referred to as an imaging region.

To thoroughly monitor the interior of such a store, the plurality of security cameras are preferably arranged so that the imaging regions by the security cameras can cover the whole region inside the store.

However, only with this arrangement, a case remains where a region that cannot be monitored by any security camera occurs.

For example, it is assumed in the example in FIG. 1 that a person stands at a position indicated by a reference numeral 104. In such a case, part of the shelf is hidden behind the person, and an image of the part cannot be captured by the security camera 101. In the illustrated example, a region indicated by a reference numeral 105 cannot be temporarily viewed. In a case where such a situation continues for a long period, it is necessary to dispose another security camera to monitor the region 105. Occurrence of such a phenomenon cannot be inferred only from position information of the structures.

An evaluation apparatus 1 in the present embodiment evaluates fields of view of the plurality of security cameras by simulating movement of persons in addition to the position information of the structures. Further, the evaluation apparatus 1 evaluates a plurality of patterns of arrangement positions of the security cameras and determines favorable arrangement positions of the security cameras on the basis of a result of the evaluation.

[Apparatus Configuration]

Figure 2:
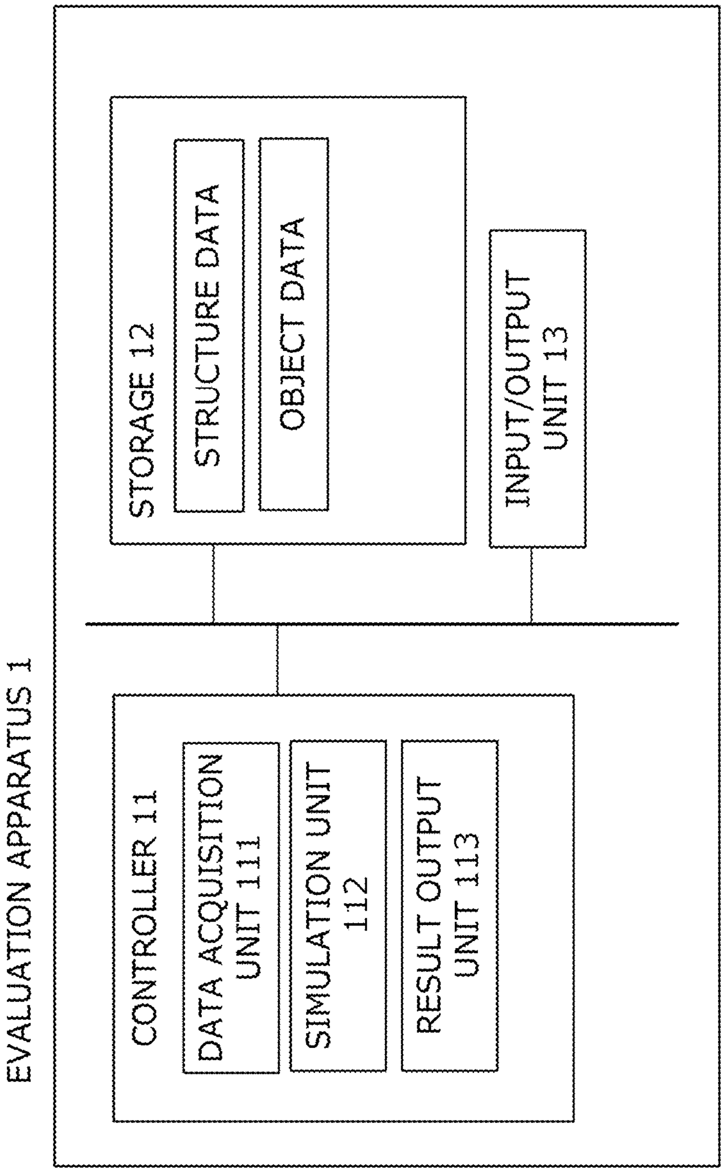
FIG. 2 is a view for explaining a module configuration of an evaluation apparatus 1.

FIG. 2 is a view illustrating an example of a configuration of the evaluation apparatus 1.

The evaluation apparatus 1 is, for example, a computer such as a server apparatus, a personal computer, a smartphone, a mobile phone, a tablet computer and a personal information terminal. The evaluation apparatus 1 includes a controller 11, a storage 12, and an input/output unit 13.

The evaluation apparatus 1 can be constituted as a computer including a processor (such as a CPU and a GPU), a main memory (such as a RAM and a ROM) and an auxiliary memory (such as an EPROM, a hard disk drive and a removable medium). In the auxiliary memory, an operating system (OS), various kinds of programs, various kinds of tables, and the like, are stored, and each function (software module) matching a predetermined purpose as will be described later can be implemented by the programs stored therein being executed. However, part or all of the functions may be, for example, implemented as a hardware module by a hardware circuit such as an ASIC and an FPGA.

The controller 11 is an arithmetic unit that implements various kinds of functions of the evaluation apparatus 1 by executing a predetermined program. The controller 11 can be, for example, implemented by a hardware processor such as a CPU. Further, the controller 11 may include a RAM, a read only memory (ROM), a cash memory, and the like.

The controller 11 includes three software modules of a data acquisition unit 111, a simulation unit 112 and a result output unit 113. Each software module may be implemented by a program stored in the storage 12 which will be described later being executed by the controller 11 (CPU).

The data acquisition unit 111 acquires data for evaluating arrangement positions of security cameras for a predetermined space. In the present embodiment, the data acquisition unit 111 acquires data regarding structures existing within a target space (hereinafter, structure data), and data regarding a virtual dynamic object that moves within the space (hereinafter, object data).

The simulation unit 112 simulates a region for which an image can be captured by each of the plurality of security cameras on the basis of the data acquired by the data acquisition unit 111. The simulation includes simulation of the dynamic object.

The result output unit 113 generates and outputs information regarding favorable arrangement of the plurality of security cameras on the basis of a result of the simulation performed by the simulation unit 112.

The storage 12, which is a unit for storing information, includes a storage medium such as a RAM, a magnetic disk and a flash memory. In the storage 12, a program to be executed by the controller 11, data to be utilized upon execution of the program, and the like, are stored.

In the storage 12, the structure data and the object data acquired by the data acquisition unit 111 are stored.

Here, an example of the structure data will be described. FIG. 3A is an example of the structure data.

The structure data is data regarding shapes and sizes of structures existing within the space. The structure data includes, for example, fields of a structure ID, a type and position information. In the structure ID field, an identifier allocated for each structure is stored. In the type field, a type of the structure (such as, for example, a column, a wall and a window) is stored. In the position information field, data regarding a position of the structure in the space is stored. Examples of such data can include, for example, a three-dimensional model of the structure, information regarding a size of the structure, information regarding an arrangement position of the structure, and the like. The controller 11 can specify positions of the structures in the space to be monitored by referring to the position information.

Note that the structure data may be a building information modeling (BIM) model or a model using 3D-CAD. Further, the structure data may include data regarding a structure of the building itself.

An example of the object data will be described next. FIG. 3B is an example of the object data.

The object data is data that defines a plurality of virtual objects that move within the space to be monitored. Examples of the virtual objects can include, for example, a person, an automobile, a bicycle, and a personal mobility. In the present embodiment, the virtual object is a person.

Each record of the object data is defined for each object. In the example in FIG. 3B, three persons are defined as objects. The object data includes fields of an object ID, a type, shape information, time point information and movement information.

In the object ID field, an identifier of the virtual object is stored. In the type field, for example, a type of the object, such as a person and an automobile, is stored. In the shape information field, data regarding a shape and a size of the object (shape information) is stored. In a case where the object is a person, the shape information may be information regarding a body height, gender, and the like. Further, in a case where the object is an automobile, the shape information may be information regarding an automobile rank, a shape, a size, and the like, of the automobile. Still further, the shape information may be three-dimensional modeling data.

In the time point information field, information regarding hours, a time point, or the like, at which the corresponding object visits the store to be monitored. For example, information indicating that a certain virtual person "visits from 12 o'clock to 13 o'clock from Monday to Friday and stays for 15 minutes" may be provided.

In the movement information field, information regarding movement of the corresponding object is stored. For example, in a case where the monitoring target is a store, the movement information may be data that defines movement (time-series change of the position) of a customer from when the customer enters the store until when the customer leaves the store. The movement information may be automatically generated on the basis of a typical pattern of behavior of the customer.

Figure 4:
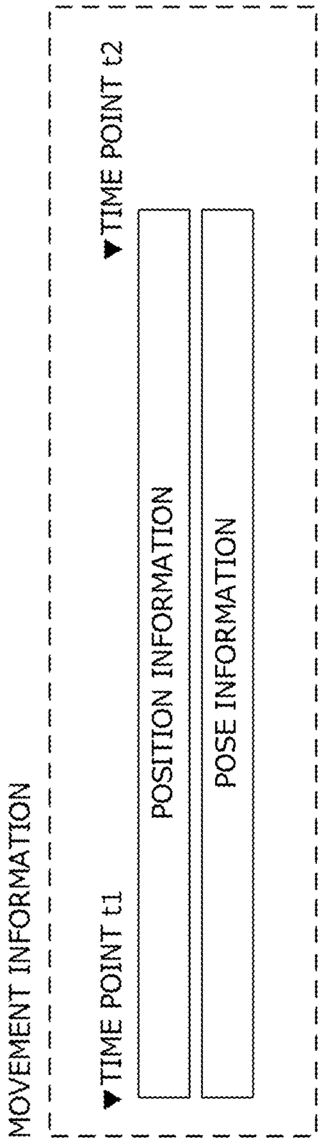
FIG. 4 is a view for explaining movement information included in object data.

The movement information may be a combination of information (position information) representing a position of the object within the space and information (pose information) representing pose of the object (person). For example, as illustrated in FIG. 4, the movement information may be data that defines each of the position information and the pose information for each time point. Here, a time point t1 is a time point at which the target object enters (or comes into) the space to be monitored, and a time point t2 is a time point at which the target object exits the space to be monitored.

The object in the present embodiment is typically a moving virtual object such as a person, an automobile, a bicycle and a personal mobility. The object may be a living object or may be a non-living object.

The object data may be prepared by a user of the evaluation apparatus 1 or may be generated on the basis of movement of the object observed in the past. Further, the object data may be generated by utilizing a machine learning model, and the like.

Description will be continued returning to FIG. 2.

The input/output unit 13 is a unit for accepting input operation performed by an operator and presenting information to the operator. Specifically, the input/output unit 13 includes a device for performing input such as a mouse and a keyboard, and a device for performing output such as a display and a speaker. The input/output device may be, for example, integrally constituted with a touch panel display, or the like.

Note that in a specific hardware configuration of the evaluation apparatus 1, omission, replacement and addition of components can be made as appropriate in accordance with embodiments. For example, the controller 11 may include a plurality of hardware processors. The hardware processors may be constituted with a microprocessor, an FPGA, a GPU, and the like. Further, an input/output device (such as, for example, an optical drive) other than those exemplified may be added. Still further, the evaluation apparatus 1 may be constituted with a plurality of computers. In this case, hardware configurations of the respective computers may be the same or do not have to be the same.

[Processing Flow]

Figure 5:
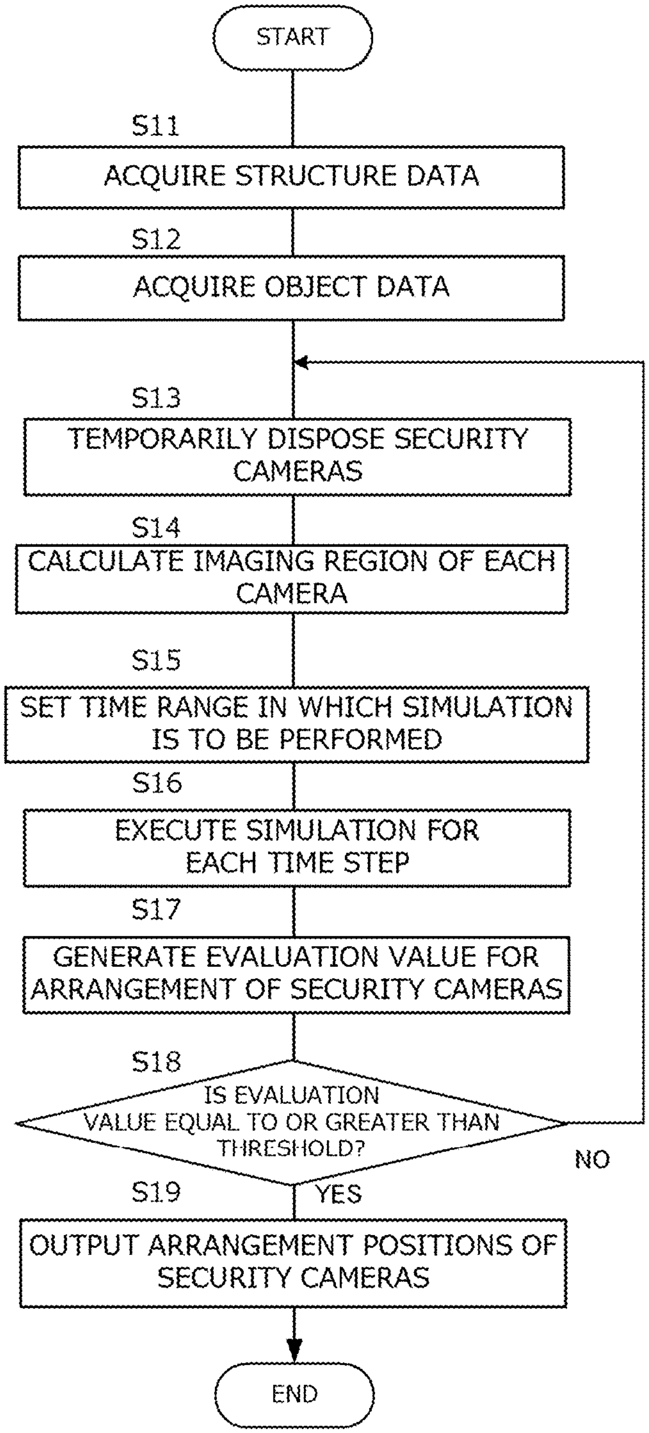
FIG. 5 is a flowchart of processing to be executed in a first embodiment.

Processing to be executed by the evaluation apparatus 1 according to the present embodiment will be described next. FIG. 5 is a flowchart of the processing to be executed by the evaluation apparatus 1. The indicated processing is started by operation by the operator of the evaluation apparatus 1.

First, in step S11, the data acquisition unit 111 acquires data (structure data) regarding structures included in the space to be monitored. The structure data may be a file, or the like, described in a predetermined format or may be incorporated via the input/output unit 13. The operator of the apparatus can generate structure data for the target space and import the structure data to the evaluation apparatus 1.

Then, in step S12, the data acquisition unit 111 acquires data (object data) regarding an object that moves within the space to be monitored. The object data may be a file, or the like, described in a predetermined format or may be incorporated via the input/output unit 13. The operator of the apparatus can generate object data corresponding to the object that moves within the target space and import the object data to the evaluation apparatus 1.

Note that the object data may be automatically generated. For example, the object data as illustrated in FIG. 3B can be generated also on the basis of data that statistically describes the number of persons who visit the space to be monitored per unit time, gender, visiting conditions, exiting conditions, behavior patterns from visiting to exiting, and the like. The object data may be generated by utilizing statistics and behavior patterns of persons who have visited the target space in the past under certain conditions.

Step S13 to step S18 are steps of disposing virtual security cameras on a virtual space corresponding to the space to be monitored and simulating fields of view of the virtual security cameras. These steps are executed by the simulation unit 112.

In step S13, a plurality of virtual security cameras are temporarily disposed on the virtual space. The number of security cameras may be, for example, set at an arbitrary number up to a predetermined value. The arrangement positions of the security cameras may be determined using a typical method.

Then, in step S14, imaging regions by the temporarily disposed plurality of security cameras are calculated. For example, a region that can be physically viewed from each camera is specified on the basis of parameters (such as, for example, angles of view and focal distances) and set as the imaging region. In the present step, the imaging region is calculated while structures disposed in the target space are taken into account on the basis of the structure data acquired in step S11. The imaging region may be specified by coordinates on the three-dimensional space.

Then, in step S15, a time range (time width) during which simulation is to be performed is set. The time range during which simulation is to be performed may be designated by an operator of an apparatus via the input/output unit 13. In the present step, a range such as, for example, "from 10:00 am to 7:00 pm on Monday" is designated as the time range.

In step S16, movement of the object is simulated, and fields of view viewed from the security cameras are evaluated. In the present step, the movement of the object is simulated using the object data for each time step included in the set time range, and a degree of being shielded by the object is determined for each of the plurality of security cameras.

As described above, there is a case where a region that cannot be viewed from the security cameras may occur as a result of the object moving within the space. In such a case, the region (hereinafter, monitoring impossible region) is excluded from the original imaging region. The remaining region is a monitoring possible region. The monitoring possible region means a region that can be monitored without being affected by external factors such as the object.

In step S16, such determination is performed for each time step, and statistics of a ratio of the monitoring possible region with respect to the original field of view (imaging region) are obtained.

Figure 6:
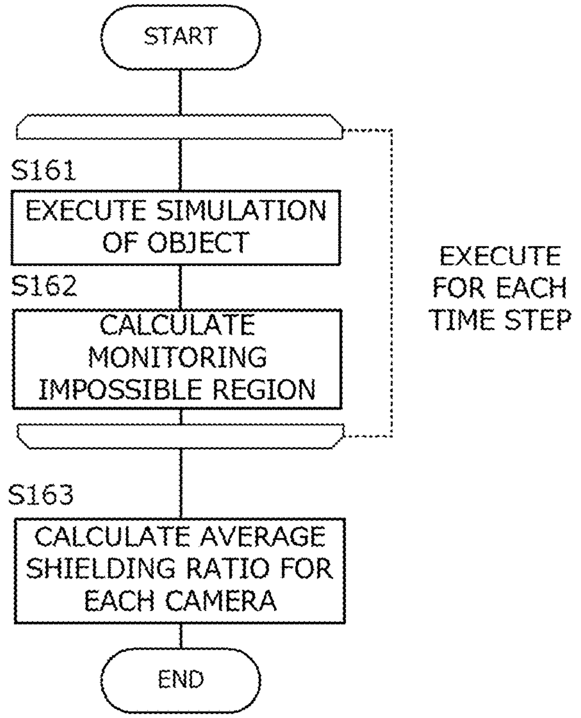
FIG. 6 is a flowchart of processing to be executed in the first embodiment.

FIG. 6 is a flowchart indicating more details of the processing to be executed in step S16.

The processing in step S161 and step S162 is executed for each predetermined time step included in the time range during which simulation is to be performed. The time step is set at predetermined intervals such as, for example, for each minute. For example, in a case where a target of simulation is one hour, and the predetermined interval is for each minute, 60 time steps are set.

First, in step S161, a position (and pose) of the object is simulated. As illustrated in FIG. 4, data regarding the position of the object (for example, a person) is defined for each time point in the object data, and thus, the position and the pose of the person at a certain time point can be determined using this.

Then, in step S162, a monitoring impossible region occurring due to existence of the object is calculated for each of the plurality of security cameras. The region shielded by the object can be obtained on the basis of position information within the three-dimensional space. In a case where there is no monitoring impossible region, the imaging region becomes equal to the monitoring possible region.

Figure 7:
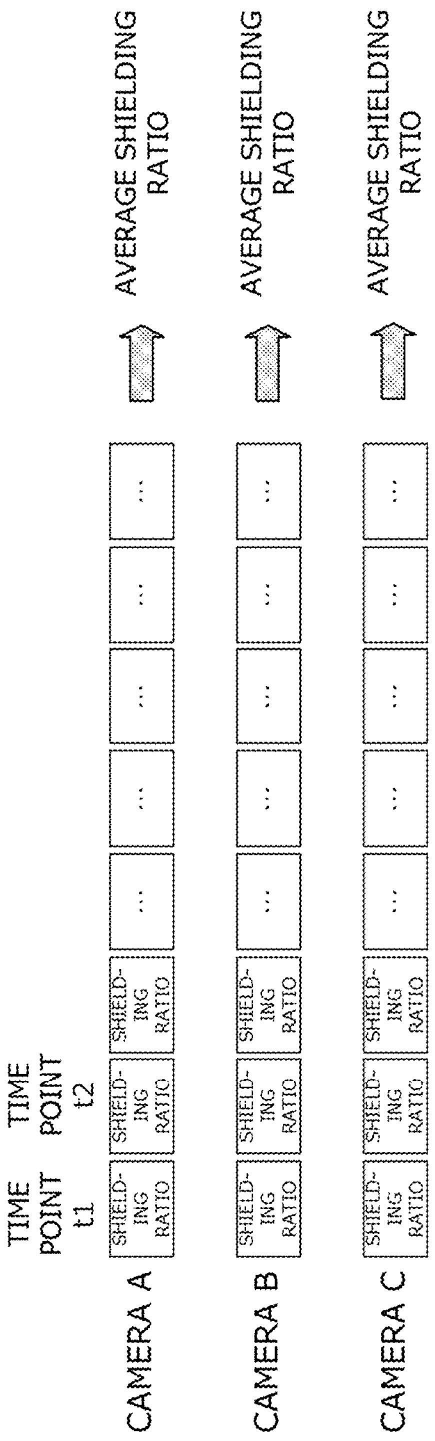
FIG. 7 is a view for explaining an average shielding ratio for each camera.

Note that in the following description, a ratio of the monitoring impossible region with respect to the imaging region will be referred to as a shielding ratio. For example, in a case where 30% of the imaging region is shielded due to the object, the shielding ratio becomes 30%. As illustrated in FIG. 7, the shielding ratio can be obtained for each time step.

If processing for all the time steps included in the time range during which simulation is to be performed ends, in step S163, an average shielding ratio for each security camera is calculated. The average shielding ratio is an average value of shielding ratios obtained for the respective time steps. A high average shielding ratio indicates that more regions are shielded by the object, and/or a total period during which part of the region is shielded by the object in the time range during which simulation is to be performed is long.

Description will be continued returning to FIG. 5.

In step S17, the result output unit 113 calculates an evaluation value for an arrangement pattern of temporarily disposed security cameras. In the present embodiment, the evaluation value becomes higher as the average shielding ratio of the plurality of temporarily disposed security cameras is lower. The evaluation value can take, for example, numerical values in a range from 0 to 100.

Note that the space to be monitored may be weighted. For example, in a case where there is a region to be intensively monitored within the space to be monitored, the evaluation value may be calculated after a greater weight is applied on the region. For example, in a case where a period during which the region is shielded by the object is long, correction is made to make the evaluation value further lower.

Further, in a case where there is a region which is not required to be monitored, the region may be excluded from a calculation target of the shielding ratio.

In step S18, the result output unit 113 determines whether or not the calculated evaluation value is equal to or greater than a predetermined threshold. Here, in a case where the calculated evaluation value falls below the predetermined threshold, the processing returns to step S13, and temporary arrangement of the security cameras is executed again.

Note that in a case where temporary arrangement of the security cameras is executed a plurality of times, the arrangement positions of the security cameras may be shifted by a predetermined value so as to cover all possible arrangement patterns. Further, a plurality of arrangement patterns of the security cameras may be set in advance, and the security cameras may be temporarily arranged in accordance with the plurality of arrangement patterns. The arrangement positions can be determined using various methods that are employed in optimization calculation.

In step S18, in a case where the calculated evaluation value is equal to or greater than the predetermined threshold, the processing transitions to step S19, and the result output unit 113 outputs a processing result. The processing result may include information regarding arrangement positions and imaging regions of the plurality of security cameras, information regarding the monitoring impossible region, information regarding the monitoring possible region, the shielding ratio, the average shielding ratio, the calculated evaluation value, and the like. Further, the processing result may include information regarding movement of the object. For example, in a case where an event that a region is shielded during most of the plurality of time steps occurs, hours during which the event occurs and information regarding the region may be output as part of the processing result. For example, information indicating that "queues of people are formed in front of the counter during busy hours, and thus, shelves behind the counter are barely visible" may be output.

Note that while in the example in FIG. 5, processing is ended in a case where the calculated evaluation value becomes equal to or greater than the predetermined threshold, the processing may be continued to obtain a more favorable arrangement pattern of the security cameras even if the evaluation value equal to or greater than the predetermined threshold is obtained. In this case, results may be sorted by the evaluation value, and a final output may be made.

As described above, the evaluation apparatus according to the present embodiment evaluates a field of view of the security camera on the basis of information regarding the structures disposed within a predetermined space and information regarding a virtual object that moves within the space. Further, the evaluation apparatus determines favorable arrangement positions of a plurality of security cameras on the basis of the evaluation result.

In particular, by executing simulation by utilizing information regarding movement of the object, it is possible to detect an event that monitoring is inhibited due to existence of the object with high accuracy.

Second Embodiment

In the first embodiment, a field of view of the security camera is evaluated while movement of a virtual object is taken into account, and favorable arrangement positions of the security cameras are determined. On the other hand, there is a factor that inhibits monitoring other than a dynamic object.

For example, a case will be considered where ambient light (such as sunlight) is incident on an inside of the space to be monitored from outside of a building. Here, if sunlight is reflected by a structure inside, there is a case where glare, or the like, occurs in an image captured by the camera, which results in occurrence of a region that cannot be sufficiently monitored. In other words, there is a case where the monitoring impossible region occurs due to a factor other than an object.

In the second embodiment, to address this, reflection of ambient light in the space to be monitored is simulated, and the monitoring impossible region (for example, a region that cannot be viewed due to glare, or the like, occurring by reflection of sunlight) due to the ambient light is calculated. Further, the evaluation value is calculated using both the simulation result of the object and the simulation result of the ambient light.

In the second embodiment, the storage 12 stores data (hereinafter, material data) regarding surface materials of structures and data (hereinafter, ambient light data) regarding the ambient light in addition to the structure data. Further, the data acquisition unit 111 is configured to be able to acquire the material data and the ambient light data.

In the second embodiment, the simulation unit 112 further executes simulation of the ambient light on the basis of the data acquired by the data acquisition unit 111.

FIG. 8 is an example of the material data to be utilized in the second embodiment.

The material data is data regarding surface materials of the structures defined by the structure data. The material data includes, for example, fields of a structure ID, a material ID and characteristic information. In the structure ID field, an identifier allocated for each structure is stored. In the material ID field, an identifier allocated for each surface material is stored. In the characteristic information field, data regarding light reflectance characteristics of the surface material is stored. Examples of such data can include, for example, a light reflection direction and a reflectance. The reflection direction represents a direction in which light is reflected when the light shines on the surface material. The reflectance represents a ratio of reflected light with respect to incident light (ratio of light not absorbed into the material).

Note that while in the present example, the structure data and the material data are separately provided, the both may be one type of data. The both can be integrated by utilizing the BIM model, or the like.

FIG. 9 is an example of the ambient light data to be utilized in the second embodiment.

The ambient light data is data regarding ambient light that illuminates the space to be monitored. The ambient light data is specifically data that defines a direction in which the ambient light is incident and intensity of the ambient light. The ambient light data includes, for example, fields of a type, an illumination condition, an azimuth angle, and an angle. In the type field, a type of the ambient light (such as, for example, sunlight and artificial illumination light) is stored. In a case where the ambient light changes in accordance with the season and hours, in the illumination condition field, related data is stored. For example, a position of the sun constantly changes during one day. Further, an altitude of the sun changes over a year. In such a case, in the illumination condition field, conditions (for example, data indicating date and hours) are stored. In the azimuth angle field, data indicating an azimuth angle at which the ambient light is incident is stored. In the angle field, data indicating an angle at which the ambient light is incident (for example, an elevation angle of the sun) is stored. Note that the ambient light data may include data regarding characteristics of the ambient light (such as, for example, intensity and a wavelength) other than this.

Note that while in the example in FIG. 9, the azimuth angle and the angle are defined for each illumination condition, in a case where a light source that continuously moves like the sun is defined, these may be expressed with a mathematical expression.

Figure 10:
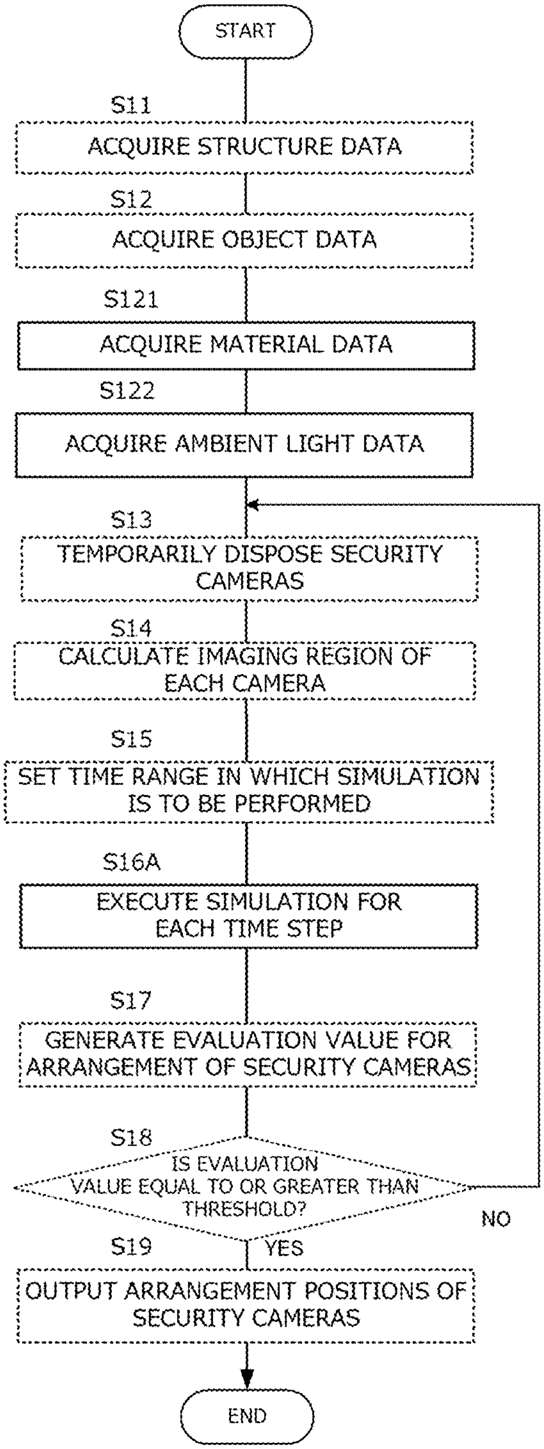
FIG. 10 is a flowchart of processing to be executed in the second embodiment.

FIG. 10 is a flowchart of processing to be executed by the controller 11 in the second embodiment. Processing similar to the processing in the first embodiment will be indicated with dashed lines, and description will be omitted.

After the object data is acquired in step S12, in step S121, the data acquisition unit 111 acquires the material data. Further, in step S122, the data acquisition unit 111 acquires the ambient light data. Each piece of data may be a file, or the like, described in a predetermined format or may be incorporated via the input/output unit 13. The acquired material data and ambient light data are stored in the storage 12.

Figure 11:
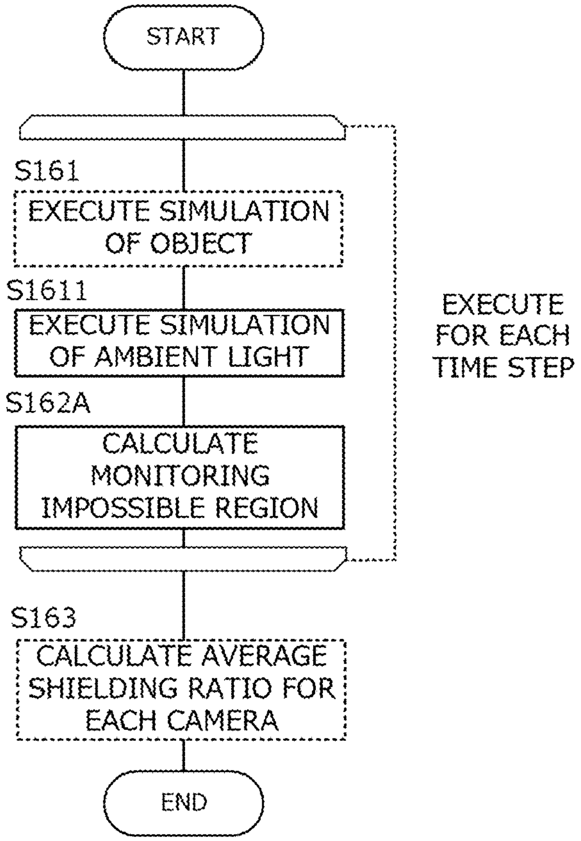
FIG. 11 is a flowchart of processing to be executed in the second embodiment.

In the second embodiment, in step S16A, the simulation unit 112 performs simulation of the object and simulation of the ambient light at the same time. FIG. 11 is a flowchart of processing to be executed in step S16A. The processing from step S161 to S162A is executed for each time step in a similar manner to the first embodiment.

First, in step S161, the simulation unit 112 simulates the position of the object in a similar manner to the first embodiment.

Then, in step S1611, the simulation unit 112 executes simulation of the ambient light on the virtual space on the basis of the structure data, the material data and the ambient light data.

The simulation of the ambient light may be performed, for example, a ray tracing method, or the like. For example, refraction, reflection, and the like, of light occurring on a surface of the object are simulated on the basis of an amount and a direction of light emitted from the light source. In this event, in a case where light is reflected on the surface of the structure, a reflection angle and a reflection amount of light can be calculated using the material data.

In step S162A, the simulation unit 112 calculates both the monitoring impossible region occurring due to existence of the object and the monitoring impossible region occurring due to reflection of the ambient light for each of the plurality of security cameras.

In the present step, whether or not light is incident with intensity of equal to or greater than a predetermined threshold is determined for each of the plurality of security cameras. In the present step, it is determined, for example, whether or not a light flux incident on a surface of a lens provided in the security camera (or a light flux per unit area) is equal to or greater than a predetermined threshold. Here, in a case where there is a security camera on which light is incident with intensity of equal to or greater than the predetermined threshold, it can be estimated that halation or glare may occur on an image captured by the security camera. Further, it can be estimated that a range in which a target cannot be sufficiently viewed occurs in the image as a result of occurrence of halation or glare. In the present step, for example, a range in which a light flux is incident with intensity equal to or greater than predetermined intensity on the surface of the lens may be specified, and the monitoring impossible region may be specified on the basis of the range.

The monitoring impossible region due to the ambient light is integrated with the monitoring impossible region due to the object.

In step S163, the average shielding ratio for each security camera is calculated in a similar manner to the first embodiment. In the second embodiment, the average shielding ratio is calculated after adding the monitoring impossible region due to the ambient light to the monitoring impossible region due to the object.

The processing in and after step S17 is similar to that in the first embodiment. In other words, a lower evaluation value is calculated as more regions are shielded by the object and as more regions are difficult to be viewed by the ambient light. Further, a lower evaluation value is calculated as a region is shielded by the object for a longer period and as a region is difficult to be viewed by the ambient light for a longer period.

As described above, in the second embodiment, a region that is difficult to be viewed by reflection of the ambient light incident on the space to be monitored is regarded as equivalent to a region shielded by the object, and the evaluation value is calculated for each security camera. This makes it possible to determine appropriate arrangement positions of the security cameras while taking into account influence of the ambient light.

(Modifications)

The above-described embodiments are merely an example, and the present disclosure can be implemented by being changed as appropriate within a range not deviating from the gist.

For example, the processing and the units described in the present disclosure can be freely combined and implemented unless technical inconsistency occurs.

Further, while in the description of the embodiments, hours during which the simulation is to be performed are designated, the simulation may be executed a plurality of times on a plurality of dates and hours. In this case, favorable arrangement positions of the security cameras may be output for each of dates and hours on the basis of the evaluation value obtained for each of dates and hours.

Further, in the description of the embodiments, the evaluation value is calculated using the average shielding ratio for each time step. However, the evaluation value may be calculated using other methods as long as the evaluation value becomes smaller as a region shielded by the object is smaller in a certain time step, and as a period during which the region is shielded by the object is shorter.

Further, while the object data exemplified in the embodiments is data that defines a virtual object, the object data may be generated on the basis of actual measurement in a real space.

Further, while in the description of the embodiments, a term of the arrangement position of the security camera is used as meaning of coordinates at which the security camera is disposed, the arrangement position of the security camera may be concept including coordinates and an angle (direction in which the lens faces) of the security camera. In this case, the evaluation value may be calculated while the direction in which each security camera faces is further changed in a loop from step S13 to step S18.

Further, in a case where the number and arrangement (coordinates) of the security cameras are determined, the evaluation value may be calculated while only the directions of the security cameras are changed in the loop from step S13 to step S18. In other words, the arrangement position may be concept including only the direction.

Further, while in the description of the embodiments, stationary cameras are used as the security cameras, a plurality of security cameras may be cameras whose dynamic arrangement positions can be changed (for example, mobilities equipped with cameras). In this case, the evaluation apparatus 1 may transmit instruction information that gives an instruction of favorable positions of the security cameras to a control apparatus that controls the arrangement positions of the security cameras.

Further, the plurality of security cameras may be cameras whose angles (directions) can be dynamically changed. In this case, the evaluation apparatus 1 may transmit instruction information that gives an instruction of angles (directions) to a control apparatus that controls the angles of the security cameras.

Further, in a case where the favorable arrangement positions of the security cameras are different for each of hours (time slots), the evaluation apparatus 1 may transmit the instruction information described above to the control apparatus of the security cameras to change the arrangement positions of the security cameras for each of the hours.

Further, while in the description of the embodiments, the simulation unit 112 automatically generates the arrangement positions of the security cameras, the arrangement positions of the security cameras may be designated by the operator of the evaluation apparatus 1. In this case, conditions regarding the arrangement positions of the security cameras, such as coordinates and directions, may be acquired via the input/output unit 13, and the evaluation value (or a simulation result) under the conditions may be output. In other words, the evaluation apparatus 1 may function as an apparatus that evaluates a size of the monitoring possible region under the designated conditions.

Further, a process described as being performed by one apparatus may be shared and executed by a plurality of apparatuses. Or alternatively, processes described as being performed by different apparatuses may be executed by one apparatus. In a computer system, what hardware configuration (server configuration) each function is realized by can be flexibly changed.

The present disclosure can be realized by supplying a computer program implemented with the functions described in the above embodiments to a computer, and one or more processors included in the computer reading out and executing the program. Such a computer program may be provided for the computer by a non-transitory computer-readable storage medium connectable to a system bus of the computer or may be provided for the computer via a network. As the non-transitory computer-readable storage medium, for example, any type of disk/disc such as a magnetic disk (a floppy (registered trademark) disk, a hard disk drive ((HDD), or the like) and an optical disc (a CD-ROM, a DVD disc, a Blu-ray disc, or the like), a read-only memory (ROM), a random-access memory (RAM), an EPROM, an EEPROM, a magnetic card, a flash memory, an optical card, and any type of medium that is appropriate for storing electronic commands are included.

What is claimed is:

1. An information processing apparatus comprising:

a controller configured to generate an evaluation result obtained by evaluating a degree of a field of view of a security camera disposed in a predetermined space being shielded due to an object, on a basis of:

structure data regarding a structure existing in the predetermined space;

weights applied to regions within the predetermined space based on an intensity of monitoring of each of the regions; and object data regarding the object that moves within the predetermined space, wherein the object data is data that defines movement of a plurality of the objects over time, and the controller simulates movement of the object within the predetermined space on a basis of the object data and generates the evaluation result on a basis of a result of the simulation.

2. The information processing apparatus according to claim 1, wherein the controller calculates an evaluation value that becomes higher as a ratio of a region shielded by the object is smaller within the field of view of the security camera, as the evaluation result.

3. The information processing apparatus according to claim 2, wherein the controller calculates an evaluation value that becomes higher as a ratio of a period during which at least part of the field of view of the security camera is shielded by the object is smaller with respect to a predetermined time width, as the evaluation result.

4. The information processing apparatus according to claim 2, wherein the controller integrates a plurality of the evaluation values respectively corresponding to a plurality of security cameras and evaluates an arrangement pattern of the plurality of security cameras.

5. The information processing apparatus according to claim 4, wherein the controller determines arrangement of the plurality of security cameras to an arrangement pattern such that a sum of the plurality of evaluation values exceeds a predetermined value.

6. The information processing apparatus according to claim 1, wherein the object data further includes data regarding hours during which the object exists in the predetermined space.

7. The information processing apparatus according to claim 6, wherein the controller executes calculation of the evaluation value for each of hours.

8. The information processing apparatus according to claim 1, wherein the controller is configured to generate the evaluation result further on the basis of information about movement of the object.

9. The information processing apparatus according to claim 1, wherein the controller is configured to generate the evaluation result further on the basis of:

calculation of a reflection of ambient light in the predetermined space; and determination of whether any of the regions of the predetermined space are impossible to monitor based on the calculated reflection of ambient light.

10. An information processing method to be executed by an information processing apparatus, the information processing method comprising:

a step of acquiring structure data regarding a structure existing in a predetermined space;

a step of acquiring object data regarding an object that moves within the predetermined space; and a step of generating an evaluation result by evaluating a degree of a field of view of a security camera disposed in the predetermined space being shielded due to the object on a basis of the structure data and the object data, wherein generating the evaluation result is based on weights applied to regions within the predetermined space based on an intensity of monitoring of each of the regions, wherein the object data is data that defines movement of a plurality of the objects over time, and the movement of the object within the predetermined space is simulated on a basis of the object data, and the evaluation result is generated on a basis of a result of the simulation.

11. The information processing method according to claim 10, wherein an evaluation value that becomes higher as a ratio of a region shielded by the object is smaller within the field of view of the security camera is calculated as the evaluation result.

12. The information processing method according to claim 11, wherein an evaluation value that becomes higher as a ratio of a period during which at least part of the field of view of the security camera is shielded by the object is smaller with respect to a predetermined time width is calculated as the evaluation result.

13. The information processing method according to claim 11, further comprising:

a step of integrating a plurality of the evaluation values respectively corresponding to a plurality of security cameras and evaluating an arrangement pattern of the plurality of security cameras.

14. The information processing method according to claim 13, wherein arrangement of the plurality of security cameras is determined to an arrangement pattern such that a sum of the plurality of evaluation values exceeds a predetermined value.

15. A non-transitory storage medium storing a program for causing a computer to execute the information processing method according to claim 14.

16. The information processing method according to claim 10, wherein the step of generating the evaluation result is performed further on the basis of information about movement of the object.

17. The information processing method according to claim 10, wherein the step of generating the evaluation result further comprises:

calculating of a reflection of ambient light in the predetermined space; and determining whether any of the regions of the predetermined space are impossible to monitor based on the calculated reflection of ambient light.

* * * * *